US008884965B2

(12) United States Patent
Chuang et al.

(10) Patent No.: US 8,884,965 B2
(45) Date of Patent: Nov. 11, 2014

(54) MACHINE-IMPLEMENTED METHOD AND AN ELECTRONIC DEVICE FOR GRAPHICALLY ILLUSTRATING A STATISTICAL DISPLAY BASED ON A SET OF NUMERICAL DATA, AND A COMPUTER PROGRAM PRODUCT

(75) Inventors: Chang-Shan Chuang, Taipei (TW); Hao-Yuan Chuang, Taipei (TW)

(73) Assignee: Chii Ying Co., Ltd., Taipei (TM)

( * ) Notice: Subject to any disclaimer, the term of this patent is extended or adjusted under 35 U.S.C. 154(b) by 748 days.

(21) Appl. No.: 13/004,150

(22) Filed: Jan. 11, 2011

(65) Prior Publication Data
US 2012/0062569 A1 Mar. 15, 2012

(30) Foreign Application Priority Data
Sep. 14, 2010 (TW) .............................. 99131020 A (51) Int. Cl.
*G06T 11/20* (2006.01)
(52) U.S. Cl.
CPC ................................ *G06T 11/206* (2013.01)
USPC ........................................................ 345/440
(58) Field of Classification Search
USPC ........................................................ 345/440
See application file for complete search history.

(56) References Cited

U.S. PATENT DOCUMENTS

| 5,734,382 | A  | * | 3/1998 | Kuno ............................ 345/440 |
| 6,801,201 | B2 |   | 10/2004 | Escher |
| 2004/0164983 | A1 |   | 8/2004 | Khozai |
| 2008/0273743 | A1 | * | 11/2008 | Woodard et al. .............. 382/100 |
| 2011/0288921 | A1 | * | 11/2011 | King ........................... 705/14.23 |
| 2012/0062569 | A1 |   | 3/2012 | Chuang et al. |

FOREIGN PATENT DOCUMENTS

| CN | 1308301 A    | 8/2001 |
| EP | 0 824 821 B1 | 4/2002 |
| TW |    494329 B  | 7/2002 |
| TW | 200949757 A  | 12/2009 |

* cited by examiner

*Primary Examiner* — Xiao Wu
*Assistant Examiner* — Wynton S Jones
(74) *Attorney, Agent, or Firm* — Dickstein Shapiro LLP (57) ABSTRACT

An electronic device is for graphically illustrating a statistical display based on a set of numerical data. The electronic device includes a computing unit, a plot generating unit, and an output unit. The computing unit is for computing a geometric mean of the set of numerical data and a first generalized mean with a first non-zero exponent of the set of numerical data. The plot generating unit is coupled to the computing unit for generating a plot with reference to the geometric mean and the first generalized mean computed by the computing unit. The plot has first and second indications that are aligned in an axis direction, and that respectively correspond to the first generalized mean and the geometric mean. The output unit is coupled to the plot generating unit for outputting the plot for viewing by a user.

16 Claims, 9 Drawing Sheets

MACHINE-IMPLEMENTED METHOD AND AN ELECTRONIC DEVICE FOR GRAPHICALLY ILLUSTRATING A STATISTICAL DISPLAY BASED ON A SET OF NUMERICAL DATA, AND A COMPUTER PROGRAM PRODUCT

CROSS-REFERENCE TO RELATED APPLICATION

This application claims priority of Taiwanese Application No. 099131020, filed on Sep. 14, 2010.

BACKGROUND OF THE INVENTION

1. Field of the Invention

The invention relates to a machine-implemented method and an electronic device for graphically illustrating a statistical display and to a computer program product for implementing the method, more particularly to a machine-implemented method and an electronic device for graphically illustrating a statistical display based on a set of numerical data, the display being easy to read, and to a computer program product for implementing the machine-implemented method.

2. Description of the Related Art

Statistical analysis tools are used to collect and organize data, and to present an objective interpretation of the collection of numerical data through a statistical plot. When reading a statistical plot, an observation emphasis is the central tendency and statistical dispersion of the distribution of the numerical data. Various mathematical means are commonly used to represent the distribution of a given set of numerical data, especially in the field of finance, such as for price/earning (P/E) ratios, interest protection multiples, etc. Among the various mathematical means, the arithmetic mean is greatly affected by large outliers, and the harmonic mean is greatly affected by small outliers.

SUMMARY OF THE INVENTION

Therefore, the object of the present invention is to provide a machine-implemented method and an electronic device for graphically illustrating a statistical display based on a set of numerical data, where the display is easy to read, and is capable of simultaneously displaying the central tendency and the dispersion of the set of numerical data, and a computer program product for implementing the machine-implemented method.

According to one aspect of the present invention, there is provided an electronic device for graphically illustrating a statistical display based on a set of numerical data. The electronic device includes a computing unit, a plot generating unit, and an output unit. The computing unit is for computing a geometric mean of the set of numerical data and a first generalized mean with a first non-zero exponent of the set of numerical data. The plot generating unit is coupled to the computing unit for generating a plot with reference to the geometric mean and the first generalized mean computed by the computing unit. The plot has first and second indications that are aligned in an axis direction, and that respectively correspond to the first generalized mean and the geometric mean. The output unit is coupled to the plot generating unit for outputting the plot for viewing by a user.

According to another aspect of the present invention, there is provided a machine-implemented method for graphically illustrating a statistical display based on a set of numerical data. The machine-implemented method includes the steps of: (a) computing, with a processor, a geometric mean of the set of numerical data, and a first generalized mean with a first non-zero exponent of the set of numerical data; (b) generating, with the processor, a plot with reference to the geometric mean and the first generalized mean computed in step (a), the plot having first and second indications that are aligned in an axis direction, and that respectively correspond to the first generalized mean and the geometric mean; and (c) outputting the plot generated in step (b) for viewing by a user.

According to yet another aspect of the present invention, there is provided a computer program product including a computer readable storage medium that includes program instructions, which when executed by an electronic device, cause the electronic device to perform the above described machine-implemented method.

The advantages and effects of the present invention reside in that the graphically illustrated statistical display simultaneously presents information related to the geometric mean and at least one generalized mean with a non-zero exponent of the set of numerical data, such that it presents more information regarding the central tendency and the dispersion of the set of numerical data as compared to the conventional statistical graphs.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
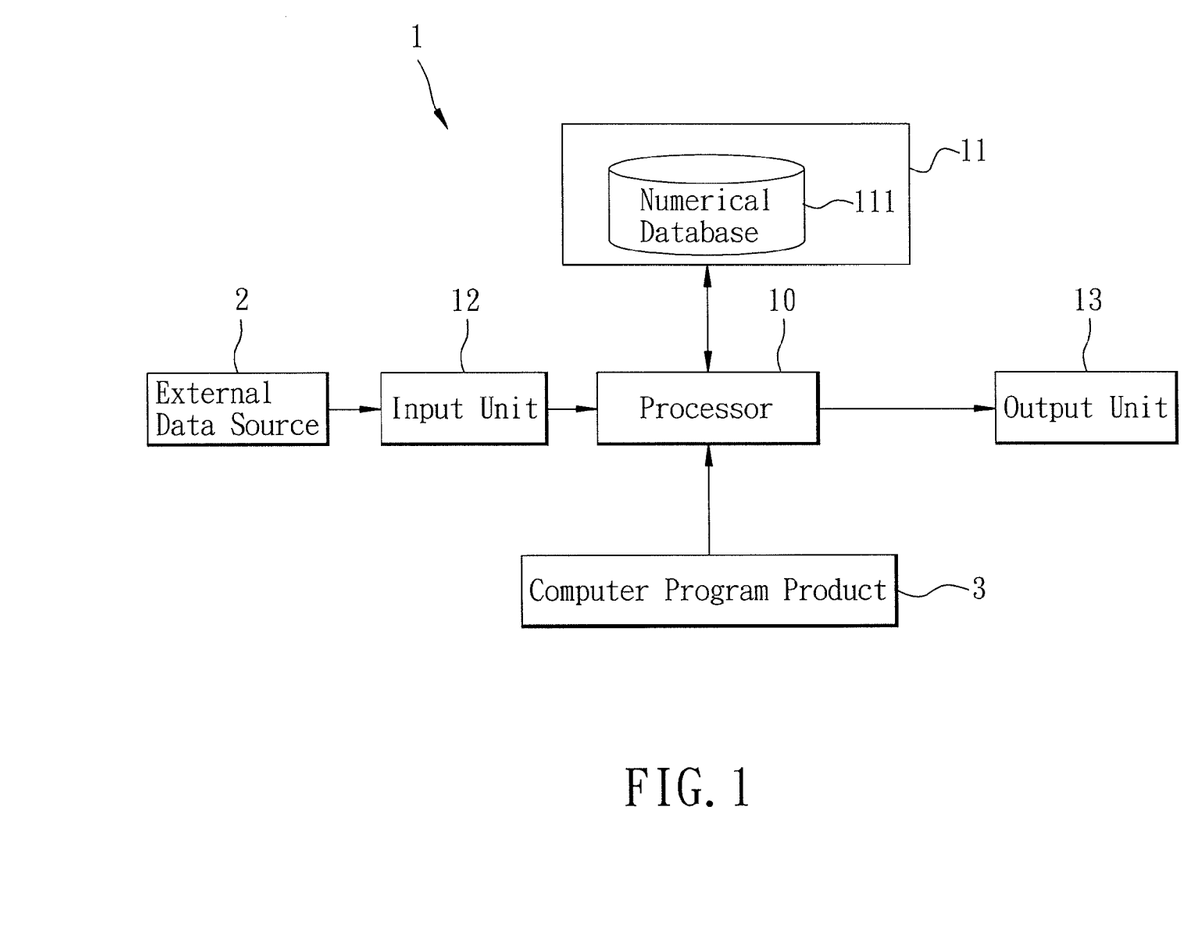
FIG. 1 is a block diagram, illustrating an electronic device for graphically illustrating a statistical display based on a set of numerical data according to the first preferred embodiment of the present invention.

With reference to FIG. 1, an electronic device 1 for graphically illustrating a statistical display based on a set of numerical data according to the first preferred embodiment of the present invention includes a processor 10, and a storage unit 11, an input unit 12 and an output unit 13 all coupled electrically to the processor 10. The processor 10 is for performing steps of the machine-implemented method for graphically illustrating a statistical display based on a set of numerical data according to the present invention. In particular, the processor 10 is capable of executing program instructions of a computer readable storage medium of a computer program product 3 that causes the processor 10 to perform steps of the machine-implemented method of the present invention. In addition, the storage unit 11 has a numerical database 111 established therein.

The electronic device 1 can be, but is not limited to, a personal computer, a workstation, a notebook computer, a palmtop computer, data processing equipment, audiovisual equipment, a personal digital assistant (PDA), etc.

The computer program product 3 may be written in programming languages such as C, Visual C++, Visual Basic, JAVA, etc. The processor 10 is a central processor in this embodiment. The input unit 12 permits input of the set of numerical data from an external data source 2, such as a host containing financial data, to the processor 10, which then stores the set of numerical data in the numerical database 111 of the storage unit 11. To associate operably with the external data source 2, the input unit 12 may be an Internet interface, or other transmission interfaces capable of communicating with the external data source 2, or may be a keyboard, a mouse, a remote controller, a voice recognition system, a touch panel of a mobile phone, etc. in cases where the set of numerical data is inputted by a user. The output unit 13 may include a display screen (not shown). The output unit 13 can be a computer monitor, a TV screen, a display screen of a mobile phone, or a printer, as long as the statistical display may be viewed by the user in some way.

Figure 2:
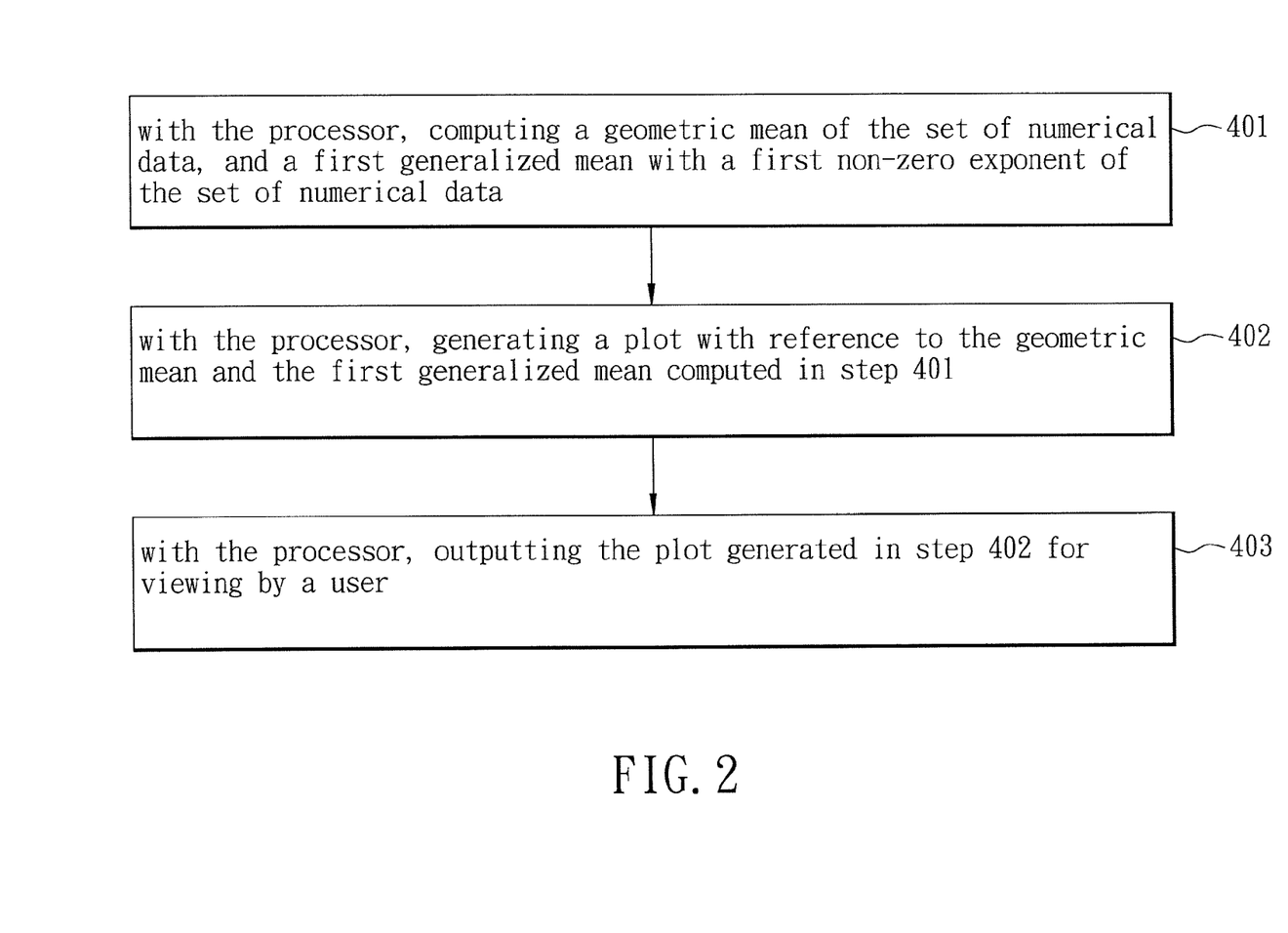
FIG. 2 is a flow chart, illustrating a machine-implemented method for graphically illustrating a statistical display based on a set of numerical data according to a first implementation of the first preferred embodiment of the present invention.

With reference to FIG. 2, a first implementation of the machine-implemented method for graphically illustrating a statistical display based on a set of numerical data according to the first preferred embodiment of the present invention includes the following steps.

In step 401, with the processor 10, a geometric mean of the set of numerical data, and a first generalized mean with a first non-zero exponent of the set of numerical data are computed.

Figure 3:
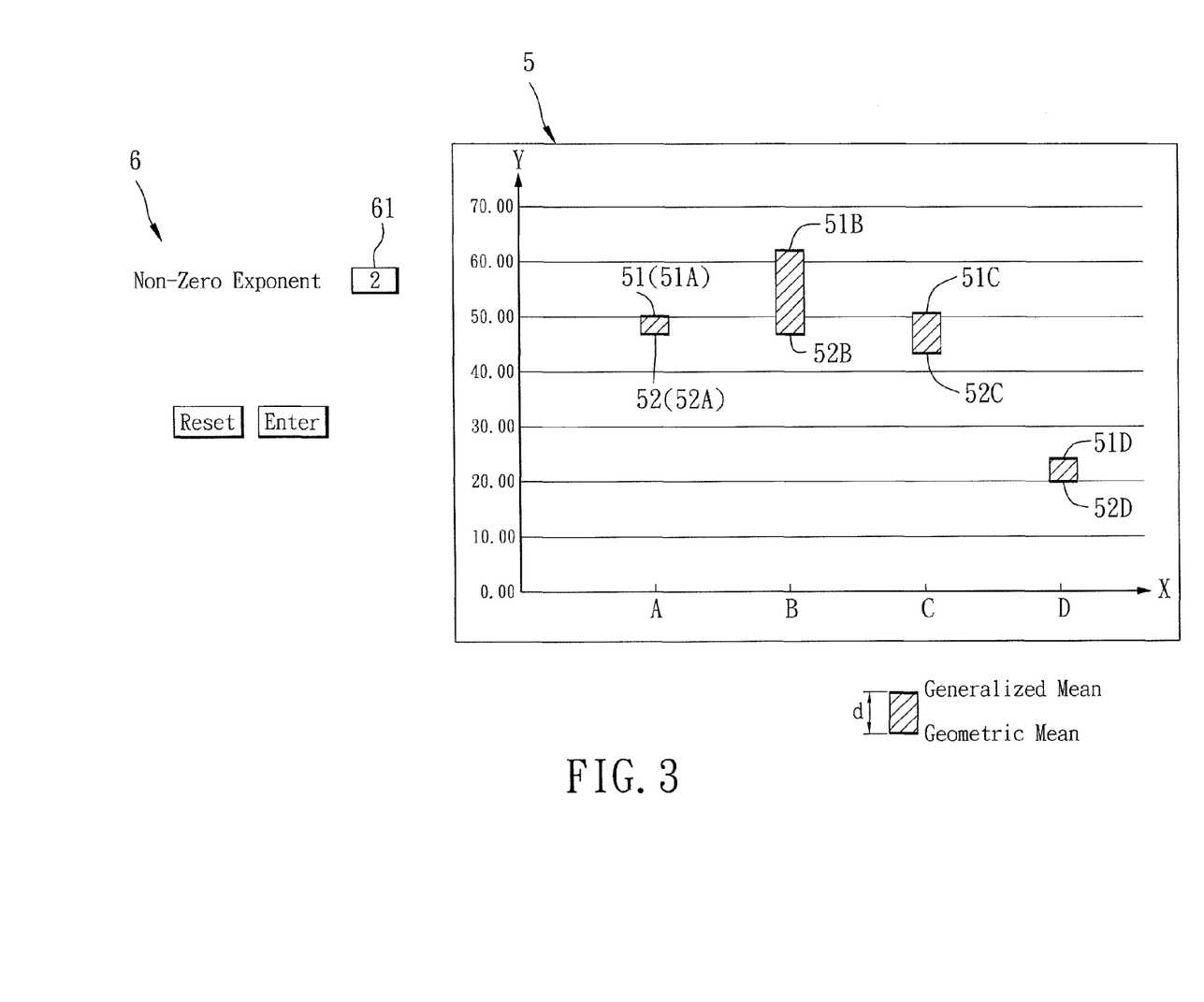
FIG. 3 is a schematic diagram of a user interface and a plot generated according to a first exemplary embodiment of the present invention.

In step 402, with the processor 10, a plot 5 (an example of which is shown in FIG. 3) is generated with reference to the geometric mean and the first generalized mean computed in step 401. The plot 5 has first and second indications 51, 52 (as shown in FIG. 3) that are aligned in an axis direction, and that respectively correspond to the first generalized mean and the geometric mean of the set of numerical data.

In step 403, with the processor 10, the plot 5 that is generated in step 402 is outputted for viewing by a user. To facilitate viewing, the plot 5 may be outputted together with an X-axis and a Y-axis. In this embodiment, the Y-axis defines the axis direction. However, to satisfy the requirements and needs of particular applications, the X-axis, instead of the Y-axis, may also define the axis direction in other embodiments.

In the exemplary embodiment shown in FIG. 3, the first generalized mean and the geometric mean are marked on the plot 5 to respectively serve as the first and second indications 51, 52. It should be noted herein that the first generalized mean is referred to simply as the generalized mean in FIG. 3, and the first non-zero exponent is referred to simply as the non-zero exponent in FIG. 3.

Figure 4:
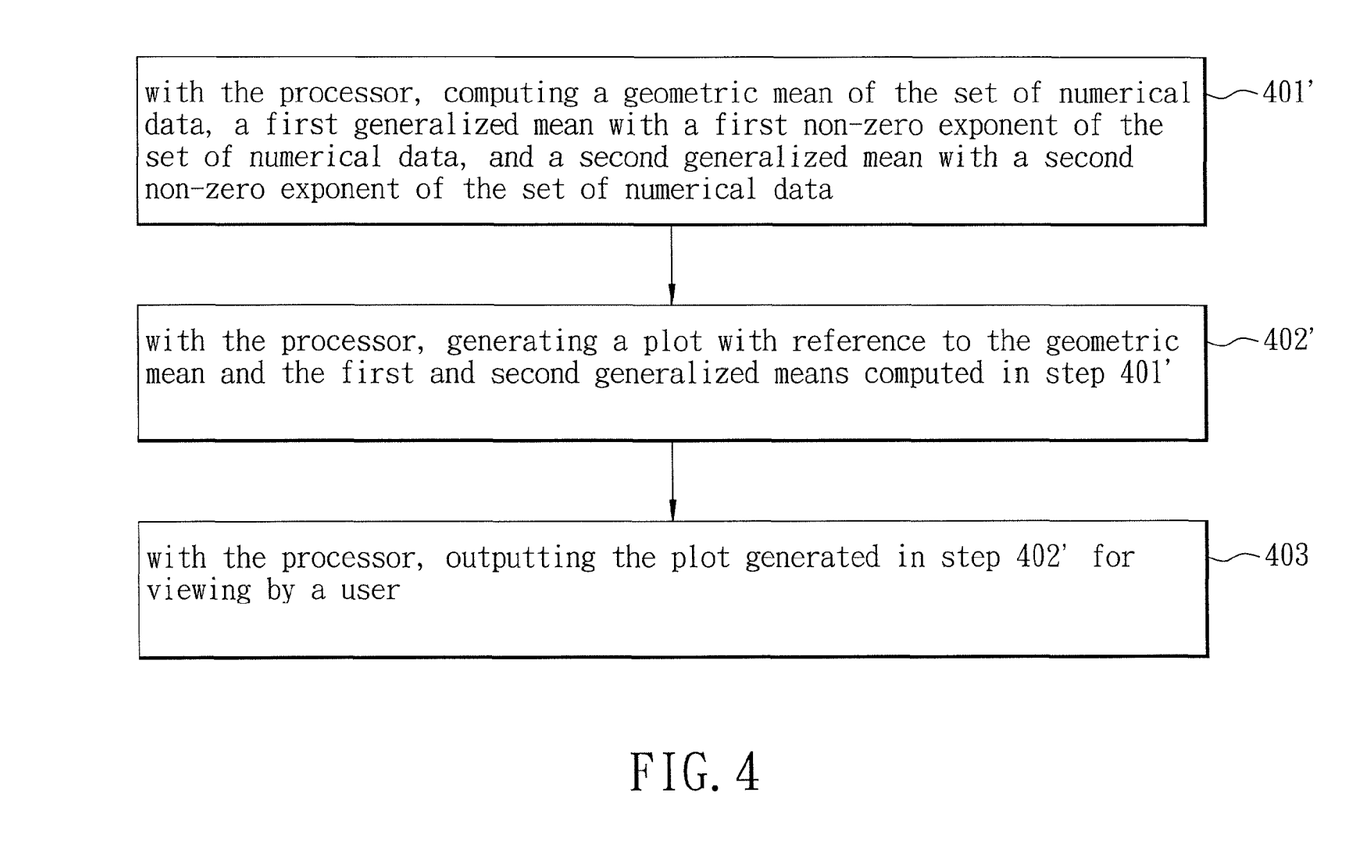
FIG. 4 is a flow chart, illustrating a machine-implemented method for graphically illustrating a statistical display based on a set of numerical data according to a second implementation of the first preferred embodiment of the present invention.
Figure 5:
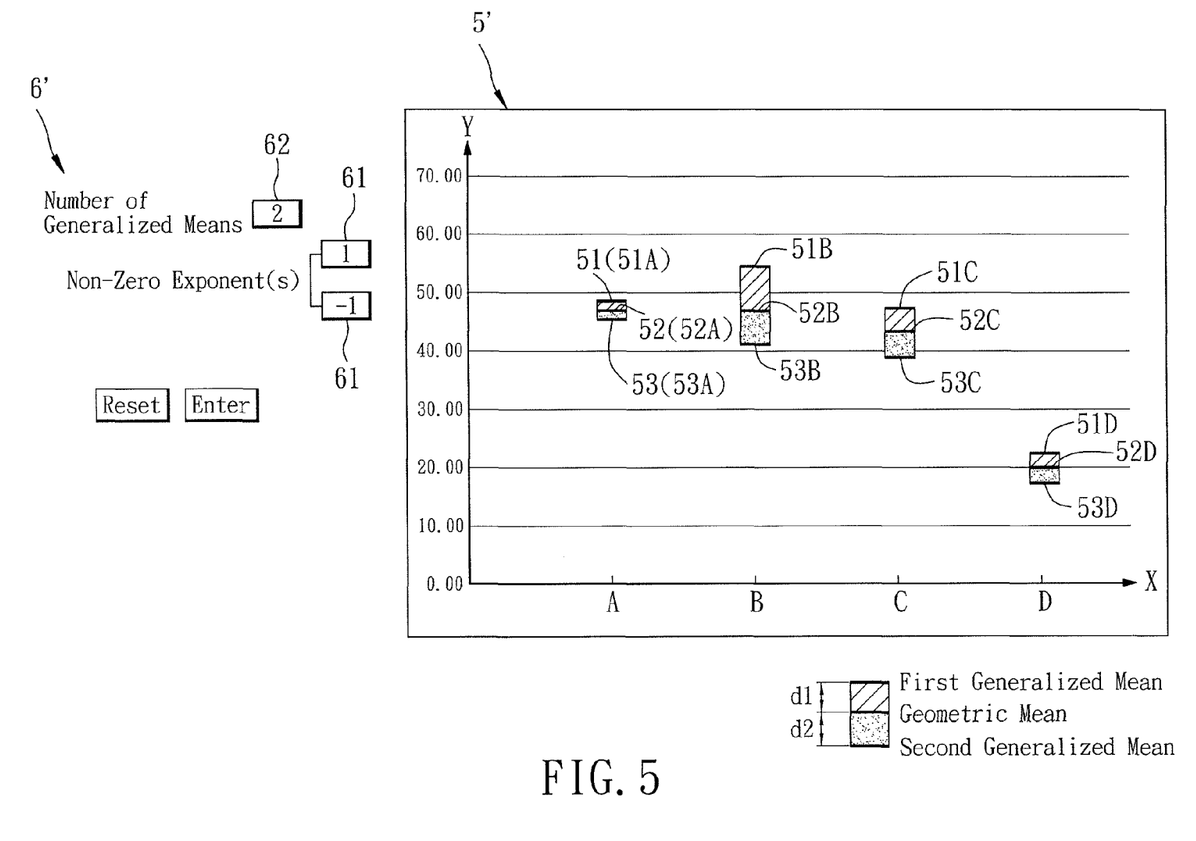
FIG. 5 is a schematic diagram of a user interface and a plot generated according to a second exemplary embodiment of the present invention.

With reference to FIG. 4 and FIG. 5, a second implementation of the machine-implemented method for graphically illustrating a statistical display based on a set of numerical data according to the first preferred embodiment of the present invention differs from the first implementation in that in step 401' of the second implementation, a second generalized mean with a second non-zero exponent of the set of numerical data is further computed with the processor 10. The first and second non-zero exponents preferably have contrary signs. In addition, the plot 5' generated in step 402' further has a third indication 53 that is aligned with the first and second indications 51, 52 in the axis direction, and that corresponds to the second generalized mean.

In the example shown in FIG. 5, the first generalized mean, the geometric mean and the second generalized mean are marked on the plot to serve as the first, second and third indications 51, 52, 53, respectively.

Figure 6:
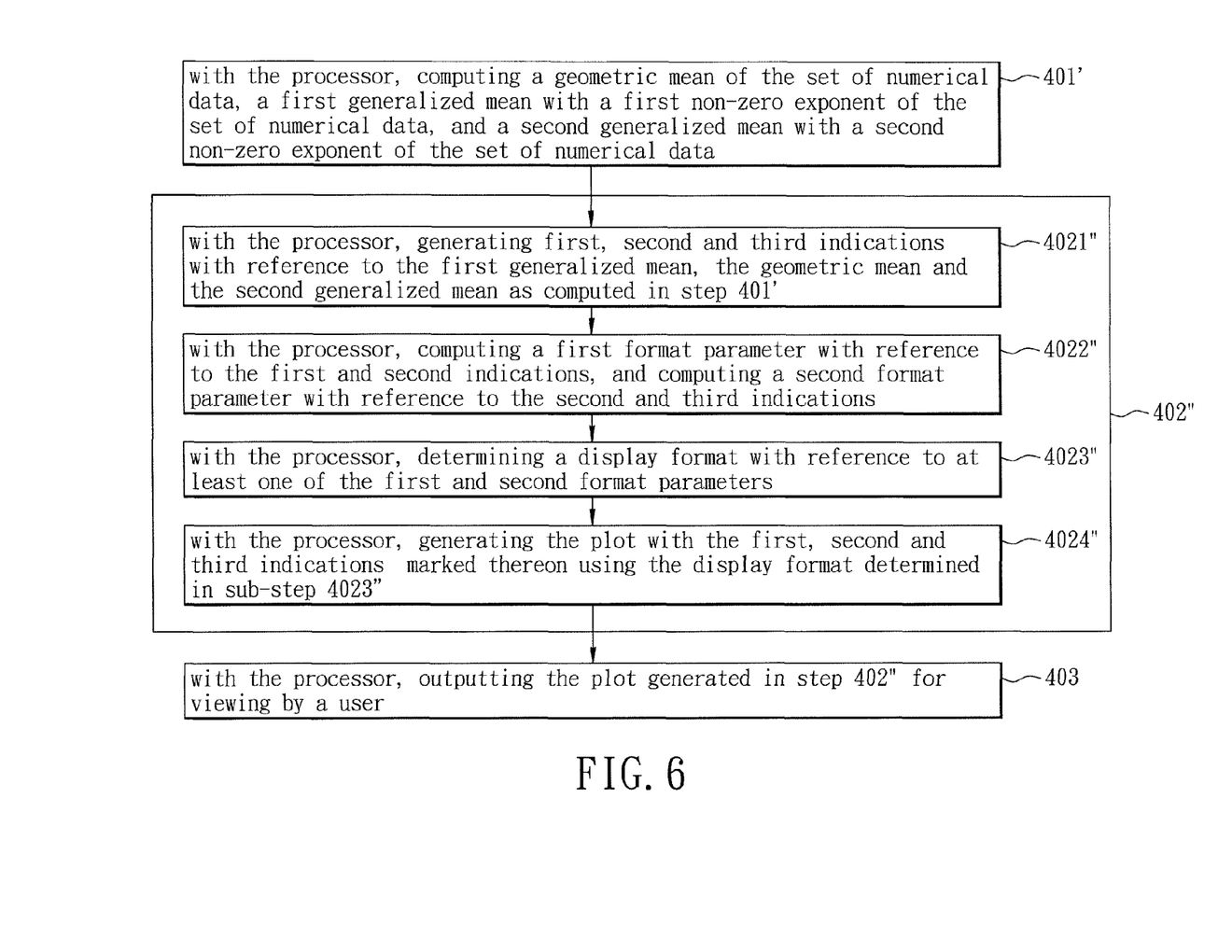
FIG. 6 is a flow chart, illustrating a machine-implemented method for graphically illustrating a statistical display based on a set of numerical data according to a third implementation of the first preferred embodiment of the present invention.
Figure 7:
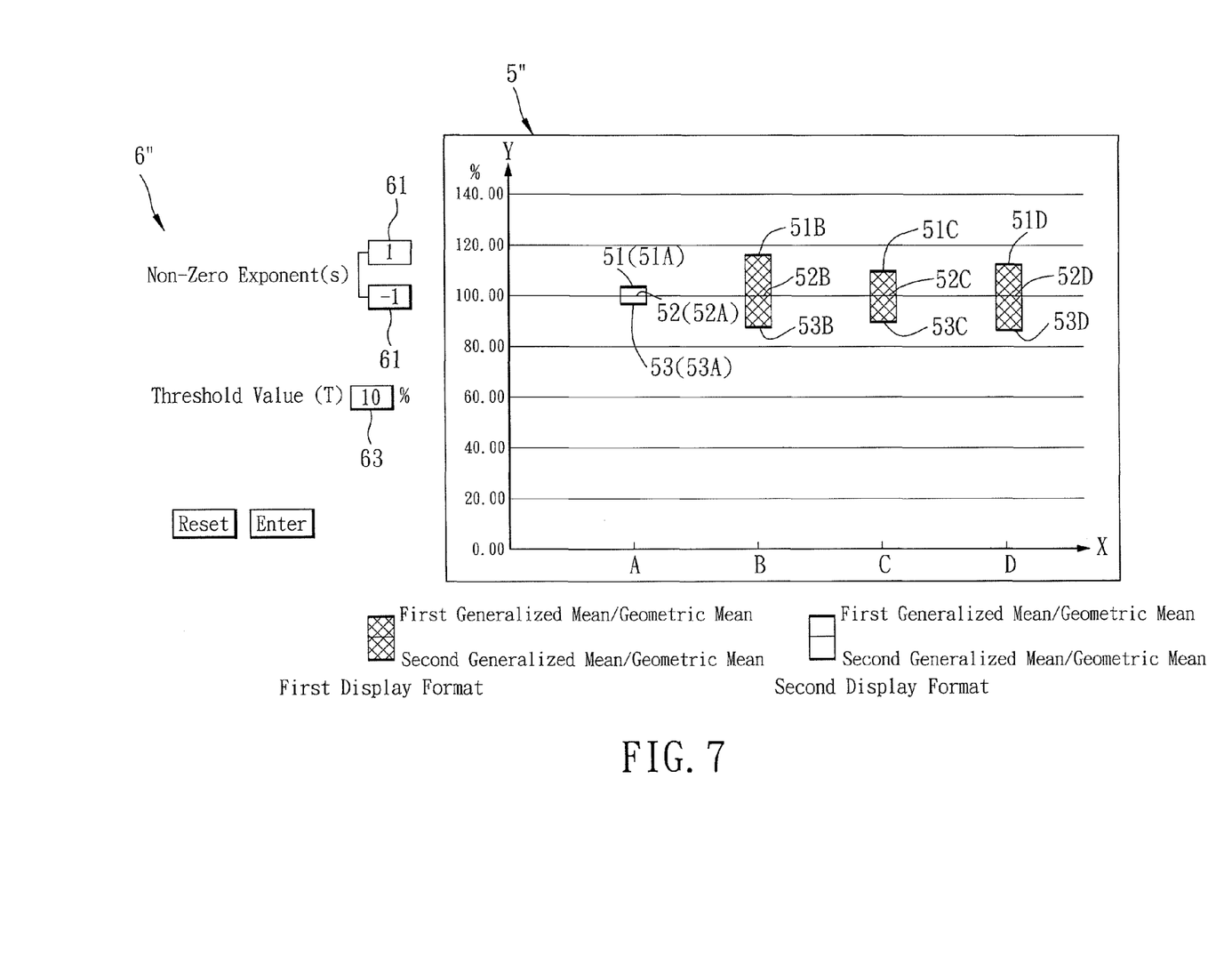
FIG. 7 is a schematic diagram of a user interface and a plot generated according to a third exemplary embodiment of the present invention.

With reference to FIG. 6 and FIG. 7, the third implementation of the machine-implemented method for graphically illustrating a statistical display based on a set of numerical data according to the first preferred embodiment of the present invention differs from the second implementation in that step 402" of the third implementation has the following sub-steps.

In sub-step 4021", with the processor 10, the first, second and third indications 51, 52, 53 are generated with reference to the first generalized mean, the geometric mean and the second generalized mean as computed in step 401'.

In sub-step 4022", with the processor 10, a first format parameter is computed with reference to the first and second indications 51, 52, and a second format parameter is computed with reference to the second and third indications 52, 53.

In sub-step 4023", with the processor 10, a display format is determined with reference to at least one of the first and second format parameters.

In sub-step 4024", with the processor 10, the plot 5" is generated with the first, second and third indications 51, 52, 53 marked thereon using the display format determined in sub-step 4023".

Specifically, in sub-step 4021", the first indication 51 is generated by dividing the first generalized mean by the geometric mean, the second indication 52 is set to correspond to a value of 1, and the third indication 53 is generated by dividing the second generalized mean by the geometric mean. In sub-step 4022", the first format parameter is computed by finding an absolute difference between the first and second indications 51, 52, and the second format parameter is computed by finding an absolute difference between the second and third indications 52, 53. In sub-step 4023", the display format is determined by comparing the first and second format parameters computed in sub-step 4022" with a threshold value (T). The display format is determined to be a first predetermined format when at least one of the first and second format parameters is greater than the threshold value (T), and is determined to be a second predetermined format when otherwise.

Figure 8:
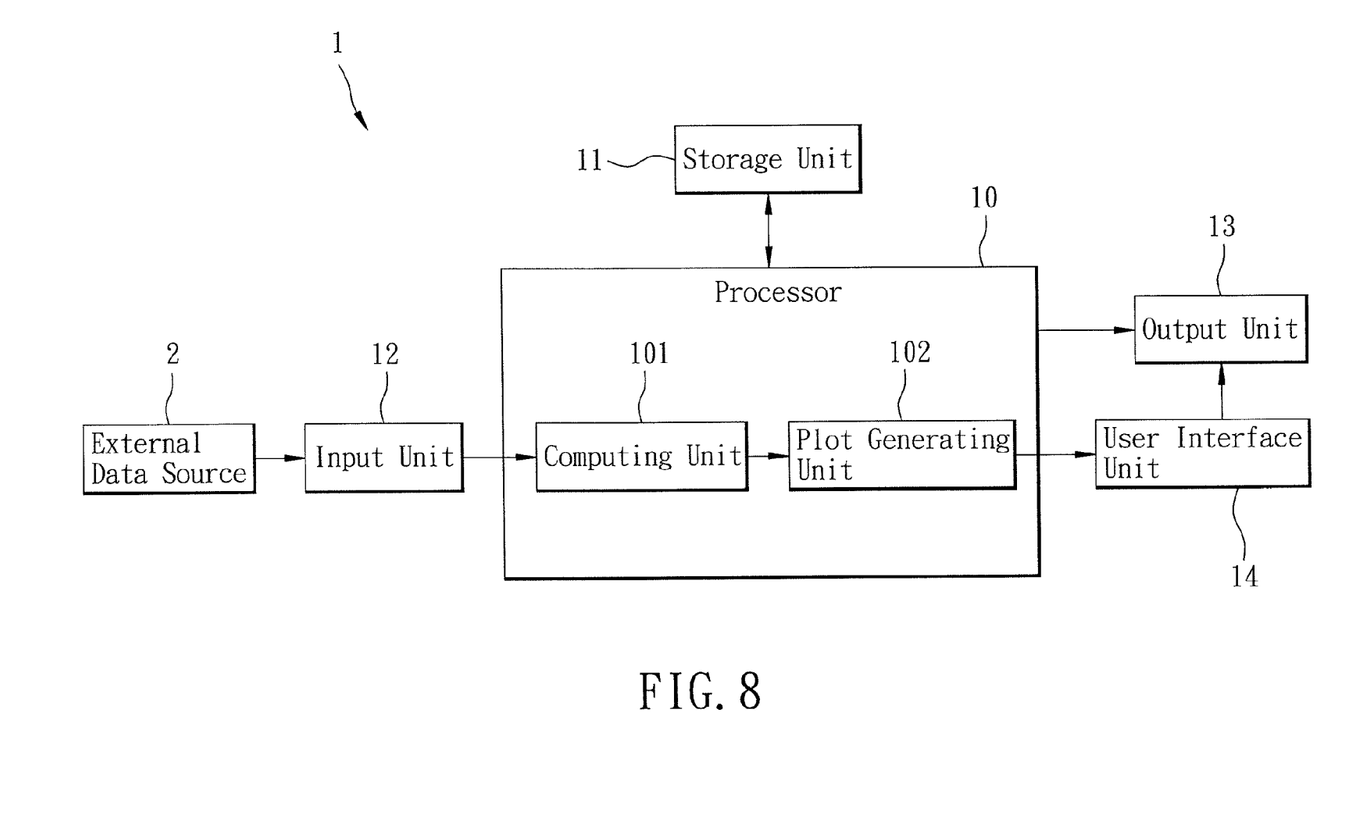
FIG. 8 is a block diagram, illustrating an electronic device for graphically illustrating a statistical display based on a set of numerical data according to the second preferred embodiment of the present invention.

Alternatively, with reference to FIG. 8, an electronic device 1 for graphically illustrating a statistical display based on a set of numerical data according to the second preferred embodiment of the present invention differs from the first preferred embodiment in that the processor 10 includes a computing unit 101 and a plot generating unit 102. The computing unit 101 computes a geometric mean of the set of numerical data and a first generalized mean with a first non-zero exponent of the set of numerical data. The plot generating unit 102 is coupled to the computing unit 101 for generating a plot with reference to the geometric mean and the first generalized mean computed by the computing unit 101. The plot 5 (an example of which is shown in FIG. 3) has first and second indications 51, 52 that are aligned in an axis direction, and that respectively correspond to the first generalized mean and the geometric mean. The output unit 13 is coupled to the plot generating unit 102 of the processor 10 for outputting the plot 5 for viewing by a user.

In the first implementation, as shown in FIG. 3, the first generalized mean and the geometric mean are marked on the plot to respectively serve as the first and second indications 51, 52.

In the second implementation, with reference to FIG. 5 and FIG. 8, the computing unit 101 further computes a second generalized mean with a second non-zero exponent of the set of numerical data. The first and second non-zero exponents preferably have contrary signs. The plot generating unit 102 generates the plot 5' with further reference to the second generalized mean. The plot 5' further has a third indication 53 that is aligned with the first and second indications 51, 52 in the axis direction, and that corresponds to the second generalized mean. In particular, the first generalized mean, the geometric mean, and the second generalized mean are marked on the plot to respectively serve as the first, second and third indications 51, 52, 53, respectively. Preferably, the first and second non-zero exponents are respectively set to be "1" and "−1", and the first and second generalized means would then respectively be arithmetic mean and harmonic mean.

Figure 9:
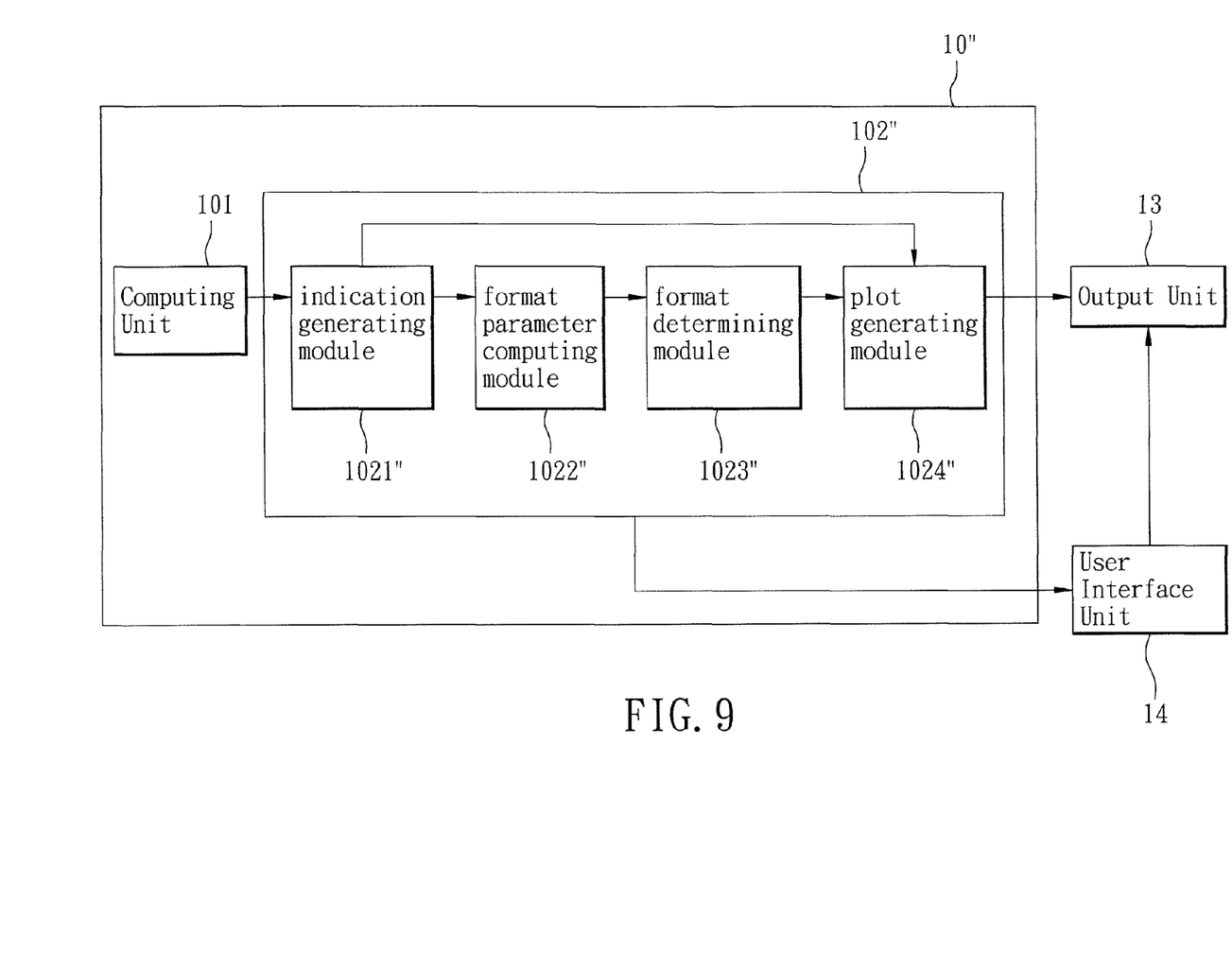
FIG. 9 is a block diagram, illustrating parts of an electronic device for graphically illustrating a statistical display based on a set of numerical data according to the third preferred embodiment of the present invention.

In the third implementation, with reference to FIG. 7, FIG. 8 and FIG. 9, the plot generating unit 102" of the processor 10" includes an indication generating module 1021", a format parameter computing module 1022", a format determining module 1023" and a plot generating module 1024". The indication generating module 1021" is coupled to the computing unit 101 for generating the first, second and third indications 51, 52, 53 with reference to the first generalized mean, the geometric mean and the second generalized mean computed by the computing unit 101. The format parameter computing module 1022" is coupled to the indication generating module 1021" for computing a first format parameter with reference to the first and second indications 51, 52, and a second format parameter with reference to the second and third indications 52, 53. The format determining module 1023" is coupled to the format parameter computing module 1022" for determining a display format with reference to at least one of the first and second format parameters. The plot generating module 1024" is coupled to the indication generating module 1021" and the format determining module 1023" for generating the plot 5" with the first, second and third indications 51, 52, 53 marked thereon using the display format determined by the format determining module 1023".

Specifically, the indication generating module 1021" generates the first indication 51 by dividing the first generalized mean by the geometric mean, and the third indication 53 by dividing the second generalized mean by the geometric mean, and sets the second indication 52 to correspond to a value of 1.

Further, the format parameter computing module 1022" computes the first format parameter by finding an absolute difference between the first and second indications 51, 52, and computes the second format parameter by finding an absolute difference between the second and third indications 52, 53.

The format determining module 1023" determines the display format by comparing the first and second format parameters with a threshold value (T). The display format is determined by the format determining module 1023" to be a first predetermined format when at least one of the first and second format parameters is greater than the threshold value (T), and to be a second predetermined format when otherwise.

According to the second preferred embodiment, the electronic device 1 further includes a user interface generating unit 14 for generating a graphical user interface (GUI) 6 (an example of which is shown in FIG. 3) that permits user input of the non-zero exponent(s) of the generalized mean(s), the number of generalized means to be computed, and/or the threshold value (T). Moreover, the output unit 13 includes a display screen (not shown). The user interface generating unit 14 is coupled to the output unit 13, and the graphical user interface 6 is displayed on the display screen. Specifically, the graphical user interface 6 shown in FIG. 3 includes a field 61 for user input of the first non-zero exponent of the first generalized mean, as well as a "reset" button and an "enter" button. The graphical user interface 6' shown in FIG. 5 includes a field 62 for user input of a number of generalized means to be computed for the set of numerical data, and at least one field 61 for user input of the non-zero exponent of the generalized mean, as well as a "reset" button and an "enter" button. The number of the field 61 for user input of the non-zero exponent corresponds to the number inputted in the field 61. Further, the graphical user interface 6" shown in FIG. 7 includes two fields 61 respectively for user input of the first and second non-zero exponents of the first and second generalized means, and a field 63 for user input of the threshold value (T), as well as a "reset" button and an "enter" button. It should be noted herein that the user interfaces 6, 6', 6" are examples only, and variations thereto are permitted under the present invention.

The present invention will be better understood with reference to the following exemplary embodiments.

For the following exemplary embodiments, statistical information related to four sets of numerical data corresponding to four companies (company A, company B, company C, company D) are to be simultaneously presented on the statistical display. Each set of numerical data includes three entries, each corresponding to an interest protection multiple of a respective year. The interest protection multiple is an index frequently used to represent the debt-paying ability of a company in its financial affair analysis. The higher the interest protection multiple, the better is the debt-paying ability. The four sets of numerical data are listed in Table 1 below.

TABLE 1

|  | Company A | Company B | Company C | Company D |
|---|---|---|---|---|
| Year 2006 | 66.58 | 26.40 | 53.37 | 26.51 |
| Year 2007 | 43.46 | 40.51 | 66.28 | 31.19 |
| Year 2008 | 35.65 | 96.33 | 23.08 | 9.62 |

With reference to FIG. 3 and FIG. 8, in the first exemplary embodiment, the computing unit 101 computes the geometric mean of each set of numerical data using the following formula (1).

$$M_0(x_1, \ldots, x_n) = \sqrt[n]{\prod_{i=1}^{n} x_i} \quad (1)$$

where $M_0(x_1, \ldots, x_n)$ denotes the geometric mean of the set of numerical data, $x_i$ denotes an $i^{th}$ entry of the set of numerical data, and n denotes the number of entries in the set of numerical data, which is 3 in this exemplary embodiment.

In this embodiment, the graphical user interface 6 generated by the user interface generating unit 14 shows a field 61 for input of the first non-zero exponent corresponding to the first generalized mean. The computing unit 101 further computes, for each set of numerical data, the first generalized mean with the first non-zero exponent using the following formula (2), where the first non-zero exponent is set by the user by inputting into the field 61 of the graphical user interface 6.

$$M_p(x_1, \ldots, x_n) = \left( \frac{1}{n} \times \sum_{i=1}^{n} x_i^p \right)^{1/p} \quad (2)$$

where $M_p(x_1, \ldots, x_n)$ denotes the first generalized mean of the set of numerical data, and p denotes the first non-zero exponent. In this embodiment, the first non-zero exponent p is set to be "2".

The geometric mean and the first generalized mean for each of the four sets of numerical data are listed in Table 2 below.

TABLE 2

|  | Company A | Company B | Company C | Company D |
| --- | --- | --- | --- | --- |
| Geometric Mean | 46.90 | 46.88 | 43.38 | 19.96 |
| First Generalized Mean (First Non-Zero Exponent = 2) | 50.31 | 62.23 | 50.91 | 24.28 |

Next, the plot generating unit 102 generates the plot 5 with reference to the geometric means and the first generalized means as computed by the computing unit 101 for the four sets of numerical data. In this embodiment, a portion of the graphical user interface 6 is reserved for display of the plot 5. The plot 5 is outputted together with an X-axis and a Y-axis, and has four sets of first and second indications 51A~51D, 52A~52D respectively corresponding to the first generalized means and the geometric means of the four sets of numerical data. The first and second indications 51A~51D, 52A~52D of the same set (i.e., corresponding to the same set of numerical data) are aligned in an axis direction, which is defined by the Y-axis in this exemplary embodiment, and are presented as horizontal bars that are connected together by two vertical bars to form a rectangular block. The sets of first and second indications 51A~51D, 52A~52D are separately arranged in the X-axis with their respective indices (corresponding to companies A~D) labeled on the X-axis.

In this exemplary embodiment, the first generalized mean and the geometric mean of each set of the numerical data are marked on the plot 5 to respectively serve as the first and second indications 51A~51D, 52A~52D. With the geometric mean marked on the plot 5, a user can readily understand the "central tendency" of the respective set of numerical data, and with the first generalized mean marked on the plot 5 alongside the geometric mean, the user can readily understand the "dispersion" of the respective set of numerical data from an absolute difference (d) between the geometric mean and the first generalized mean. If the first non-zero exponent corresponding to the first generalized mean is positive, the greater the numerical portion of the first non-zero exponent, the better is the statistical characteristic of greater entries (especially large outliers) in the set of numerical data reflected by the first generalized mean. In other words, if the first non-zero exponent is positive, the statistical characteristic of greater entries in the respective set of numerical data is better reflected by a generalized mean with exponent 2 than a generalized mean with exponent 1. On the other hand, if the first non-zero exponent is negative, the greater the numerical portion of the first non-zero exponent, the better is the statistical characteristic of smaller entries (especially small outliers) in the set of numerical data reflected by the first generalized mean. In other words, if the first non-zero exponent is negative, the statistical characteristic of smaller entries in the set of numerical data is better reflected by a generalized mean with exponent −2 than a generalized mean with exponent −1. Therefore, the greater the absolute difference (d) between the geometric mean and the first generalized mean, the greater is the dispersion of the respective set of numerical data.

Alternatively, to facilitate simultaneous viewing of the statistical characteristics of the smaller entries and the greater entries in each set of numerical data, in the second exemplary embodiment shown in FIG. 5, the electronic device 1 further provides in the graphical user interface 6', a field 62 for user input of the number of generalized means to be computed by the computing module 101. The number of the field 61 for user input of the non-zero exponent corresponds to the value entered in the field 62. Here, in FIG. 5, two of the fields 61 are generated in the graphical user interface 6' as a result of the input of "2" by the user into the field 62, and permit user input of the first and second non-zero exponents of the first and second generalized means, respectively. In this embodiment, the first non-zero exponent for the first generalized mean is "1" and the second non-zero exponent for the second generalized mean is "−1". The computing unit 101 computes the first and second generalized means using the previously-described formula (2), where $M_p(x_1, \ldots, x_n)$ denotes the first/second generalized mean, and p denotes the first/second non-zero exponent.

With the first non-zero exponent set to be "1", the first generalized mean is the arithmetic mean, and with the second non-zero exponent set to be "−1", the second generalized mean is the harmonic mean.

In this embodiment, the geometric mean, the first generalized mean and the second generalized mean computed for each of the four sets of numerical data are listed in Table 3 below.

TABLE 3

|  | Company A | Company B | Company C | Company D |
| --- | --- | --- | --- | --- |
| Geometric Mean | 46.90 | 46.88 | 43.38 | 19.96 |
| First Generalized Mean (First Non-Zero Exponent = 1) | 48.56 | 54.41 | 47.58 | 22.44 |

TABLE 3-continued

|  | Company A | Company B | Company C | Company D |
|---|---|---|---|---|
| Second Generalized Mean (Second Non-Zero Exponent = −1) | 45.40 | 41.13 | 38.88 | 17.27 |

Next, the plot generating unit 102 generates the plot 5' with reference to the geometric means and the first and second generalized means as computed by the computing unit 101 for the four sets of numerical data. As with the previous exemplary embodiment, a portion of the graphical user interface 6' is reserved for display of the plot 5', and the plot 5' is outputted together with an X-axis and a Y-axis and has marked thereon four sets of first, second and third indications 51A~51D, 52A~52D, 53A~53D respectively corresponding to the first generalized means, the geometric means and the second generalized means of the four sets of numerical data. The first, second and third indications 51A~51D, 52A~52D, 53A~53D of the same set (i.e., corresponding to the same set of numerical data) are aligned in an axis direction, which is defined by the Y-axis in this exemplary embodiment, and are shown to be horizontal bars which are connected together by vertical bars to form a "⊟"-shape block. Different display patterns may be used to represent the interval between the first and second indications and the interval between the second and third indications. The sets of first, second and third indications 51A~51D, 52A~52D, 53A~53D are separately arranged in the X-axis with their respective indices (corresponding to companies A~D) labeled on the X-axis.

In this exemplary embodiment, the first generalized mean, the geometric mean and the second generalized mean of each set of the numerical data are marked on the plot 5' to respectively serve as the first, second and third indications 51A~51D, 52A~52D, 53A~53D. With the geometric mean marked on the plot 5', a user can readily acquire knowledge of the "central tendency" of the respective set of numerical data, and with the first and second generalized means marked on the plot 5' alongside the geometric mean, the user can readily understand the "dispersion" of the respective set of numerical data from an absolute difference (d1, d2) between the geometric mean and each of the first and second generalized means. As previously described, for a positive non-zero exponent, the greater the numerical portion, the better is the statistical characteristic of greater entries (especially large outliers) in the set of numerical data reflected by the corresponding generalized mean, and for a negative non-zero exponent, the greater the numerical portion, the better is the statistical characteristic of smaller entries (especially small outliers) in the set of numerical data reflected by the corresponding generalized mean. Therefore, the greater the absolute difference (d1, d2) between the geometric mean and each of the first and second generalized means, the greater is the dispersion of the respective set of numerical data.

It should be noted herein that, the graphical user interface 6' facilitates the user to vary the inputs for the number of generalized means to be computed, as well as the value of the exponent corresponding to each generalized mean, such that the user can use the electronic device 1 to view the roles/statistical significance of different entries on the respective set of numerical data easily.

With reference to FIG. 7 and FIG. 9, in the third exemplary embodiment of the present invention, the graphical user interface 6" generated by the user interface module 14 includes two fields 61 respectively for user input of the first and second non-zero exponents corresponding to the first and second generalized means, and a field 63 for user input of the threshold value (T). The computing unit 101 computes the geometric mean and the first and second generalized means for each of the four sets of numerical data in the same manner as previously described. However, contrary to the second exemplary embodiment respectively shown in FIG. 5, instead of marking the first generalized mean, the geometric mean and the second generalized mean on the plot 5" to serve as the first, second and third indications, the plot generating unit 102", using the indication generating module 1021" thereof, generates the first indication 51 by dividing the first generalized mean by the geometric mean, sets the second indication 52 to correspond to a value of 1, and generates the third indication 53 by dividing the second generalized mean by the geometric mean.

The first, second and third indications generated for each of the four sets of numerical data are summarized in Table 4 below.

TABLE 4

|  | Company A | Company B | Company C | Company D |
|---|---|---|---|---|
| First Indication | 103.55% | 116.07% | 109.67% | 112.41% |
| Second Indication | 100% | 100% | 100% | 100% |
| Third Indication | 96.80% | 87.73% | 89.63% | 86.50% |

Further, the plot generating unit 102" decides on the display format corresponding to each of the sets of numerical data by first using the format parameter computing module 1022" thereof to compute the first format parameter by finding an absolute difference between the first and second indications 51, 52, and to compute the second format parameter by finding an absolute difference between the second and third indications 52, 53.

The first and second format parameters computed by the format parameter computing module 1022" for each of the sets of numerical data are summarized in Table 5 below.

TABLE 5

|  | Company A | Company B | Company C | Company D |
|---|---|---|---|---|
| First Format Parameter | 3.55% | 16.07% | 9.67% | 12.41% |
| Second Format Parameter | 3.2% | 12.27% | 10.37% | 13.5% |

Then, the format determining module 1023" of the plot generating unit 102" determines the display format by comparing the first and second format parameters with the threshold value (T) inputted by the user via the graphical user interface 6". The display format is determined by the format determining module 1023" to be the first predetermined format when at least one of the first and second format parameters is greater than the threshold value (T), and to be the second predetermined format when otherwise. In this embodiment, the first and second predetermined formats are respectively provided with grids and shown to be blank.

When at least one of the first and second format parameters is greater than the threshold value (T), i.e., when the display format corresponding to a particular set of numerical data is the first predetermined display format, this indicates that the dispersion (or fluctuation) of this particular set of numerical data is relatively great. On the other hand, when both of the first and second format parameters are smaller than or equal to the threshold value (T), i.e., when the display format corresponding to a particular set of numerical data is the second predetermined display format, this indicates that the dispersion (or fluctuation) of this particular set of numerical data is relatively small.

Lastly, the plot generating module 1024" of the plot generating unit 102" generates the plot 5" with the first, second and third indications 51, 52, 53 marked thereon using the display format as determined by the format determining module 1023".

In the exemplary embodiment shown in FIG. 7, since the threshold value (T) is set by the user to be 10%, only the first, second and third indications 51A, 52A, 53A corresponding to company A are shown in the second predetermined display format, while the first, second and third indications 51B~D, 52B~D, 53B~D corresponding to companies B~D are shown in the first predetermined display format.

It should be noted herein that since the first and third indications are generated as ratios of the first and second generalized means with the geometric mean, and the second indication being set to correspond to the value of 1 is essentially equivalent to locating the ratio of the geometric mean with itself, the third exemplary embodiment has the advantage that the sets of numerical data are brought to the same standard on the plot 5" so that comparison among different sets of numerical data is more objective.

In summary, the electronic device, machine-implemented method and computer program product according to the present invention facilitate graphical illustration of a statistical display based on a set of numerical data, from which the "central tendency" and the "dispersion" of the set of numerical data can be directly read. In addition, according to one implementation of the present invention, when the statistical display simultaneously displays information based on multiple sets of numerical data, a unity standard can be presented so as to facilitate objective interpretation and comparison among the sets of numerical data. Moreover, the present invention also uses different display formats to represent different statistical characteristics.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device for graphically illustrating a statistical display based on a set of numerical data, comprising:
a computing unit for computing a geometric mean of the set of numerical data, a first generalized mean with a first non-zero exponent of the set of numerical data, and a second generalized mean with a second non-zero exponent of the set of numerical data, the first and second non-zero exponents having contrary signs;
a plot generating unit coupled to said computing unit for generating a plot with reference to the geometric mean, the first generalized mean computed by said computing unit, and the second generalized mean, the plot having first and second indications that are aligned in an axis direction, and that respectively correspond to the first generalized mean and the geometric mean, and a third indication that is aligned with the first and second indications in the axis direction, and that corresponds to the second generalized mean, wherein said plot generating unit includes:
an indication generating module that is coupled to said computing unit for generating the first, second and third indications with reference to the first generalized mean, the geometric mean and the second generalized mean computed by said computing unit, wherein said indication generating module generates the first indication by dividing the first generalized mean by the geometric mean, and the third indication by dividing the second generalized mean by the geometric mean, and sets the second indication to correspond to a value of 1,
a format parameter computing module coupled to said indication generating module for computing a first format parameter with reference to the first and second indications, and a second format parameter with reference to the second and third indications,
a format determining module coupled to said format parameter computing module for determining a display format with reference to at least one of the first and second format parameters, and
a plot generating module coupled to said indication generating module and said format determining module for generating the plot with the first, second and third indications marked thereon using the display format determined by said format determining module;
and an output unit coupled to said plot generating unit for outputting the plot for viewing by a user.

2. The electronic device for graphically illustrating a statistical display based on a set of numerical data as claimed in claim 1, wherein the first generalized mean and the geometric mean are marked on the plot to respectively serve as the first and second indications.

3. The electronic device for graphically illustrating a statistical display based on a set of numerical data as claimed in claim 1, wherein the first generalized mean, the geometric mean, and the second generalized mean are marked on the plot to respectively serve as the first, second and third indications, respectively.

4. The electronic device for graphically illustrating a statistical display based on a set of numerical data as claimed in claim 1, wherein said format parameter computing module computes the first format parameter by finding an absolute difference between the first and second indications, and computes the second format parameter by finding an absolute difference between the second and third indications.

5. The electronic device for graphically illustrating a statistical display based on a set of numerical data as claimed in claim 1, wherein said format determining module determines the display format by comparing the first and second format parameters with a threshold value, the display format being determined by said format determining module to be a first predetermined format when at least one of the first and second format parameters is greater than the threshold value, and to be a second predetermined format when otherwise.

6. The electronic device for graphically illustrating a statistical display based on a set of numerical data as claimed in claim 5, further comprising a user interface generating unit for generating a graphical user interface that permits user input of the threshold value.

7. The electronic device for graphically illustrating a statistical display based on a set of numerical data as claimed in claim 6, wherein said output unit includes a display screen, said user interface generating unit is coupled to said output unit, and said graphical user interface is displayed on said display screen.

8. The electronic device for graphically illustrating a statistical display based on a set of numerical data as claimed in claim 1, wherein the first and second non-zero exponents are respectively 1 and -1, and the first and second generalized means are respectively arithmetic mean and harmonic mean.

9. The electronic device for graphically illustrating a statistical display based on a set of numerical data as claimed in claim 1, further comprising a user interface generating unit for generating a graphical user interface that permits user input of the first non-zero exponent.

10. The electronic device for graphically illustrating a statistical display based on a set of numerical data as claimed in claim 9, wherein said output unit includes a display screen, said user interface generating unit is coupled to said output unit, and said graphical user interface is displayed on said display screen.

11. A machine-implemented method for graphically illustrating a statistical display based on a set of numerical data, comprising the steps of:

computing, with a processor, a geometric mean of the set of numerical data, a first generalized mean with a first non-zero exponent of the set of numerical data, and a second generalized mean with a second non-zero exponent of the set of numerical data, the first and second non-zero exponents having contrary signs;

generating, with the processor, a plot with reference to the geometric mean and the first generalized mean, the plot having first and second indications that are aligned in an axis direction, and that respectively correspond to the first generalized mean and the geometric mean, and a third indication that is aligned with the first and second indications in the axis direction, and that corresponds to the second generalized mean, wherein the generating step comprises:

generating, with the processor, the first, second and third indications with reference to the first generalized mean, the geometric mean and the second generalized mean computing, with the processor, a first format parameter with reference to the first and second indications, and a second format parameter with reference to the second and third indications, wherein the first indication is generated by dividing the first generalized mean by the geometric mean, the second indication is set to correspond to a value of 1, and the third indication is generated by dividing the second generalized mean by the geometric mean;

determining, with the processor, a display format with reference to at least one of the first and second format parameters; and generating, with the processor, the plot with the first, second and third indications marked thereon using the determined display format; and outputting the generated plot for viewing by a user.

12. The machine-implemented method for graphically illustrating a statistical display based on a set of numerical data as claimed in claim 11, wherein the first generalized mean and the geometric mean are marked on the plot to respectively serve as the first and second indications.

13. The machine-implemented method for graphically illustrating a statistical display based on a set of numerical data as claimed in claim 11, wherein the first generalized mean, the geometric mean and the second generalized mean are marked on the plot to serve as the first, second and third indications, respectively.

14. The machine-implemented method for graphically illustrating a statistical display based on a set of numerical data as claimed in claim 11, wherein, the first format parameter is computed by finding an absolute difference between the first and second indications, and the second format parameter is computed by finding an absolute difference between the second and third indications.

15. The machine-implemented method for graphically illustrating a statistical display based on a set of numerical data as claimed in claim 11, wherein, the display format is determined by comparing the first and second format parameters with a threshold value, the display format being determined to be a first predetermined format when at least one of the first and second format parameters is greater than the threshold value, and to be a second predetermined format when otherwise.

16. A computer program product comprising a non-transitory computer readable storage medium that includes program instructions, which when executed by an electronic device, cause the electronic device to perform the machine-implemented method according to claim 11.

* * * * *